US00RE44080E

(19) United States
(12) Reissued Patent
Bailey et al.

(10) Patent Number: US RE44,080 E
(45) **Date of Reissued Patent: *Mar. 19, 2013**

(54) SULFUR ADDITIVES FOR PAVING BINDERS AND MANUFACTURING METHODS

(75) Inventors: William R. Bailey, Las Vegas, NV (US); Norm D. Pugh, Wilton, CA (US)

(73) Assignee: Shell Oil Company, Houston, TX (US)

( * ) Notice: This patent is subject to a terminal disclaimer.

(21) Appl. No.: 11/716,066

(22) Filed: Mar. 8, 2007
(Under 37 CFR 1.47)

Related U.S. Patent Documents

Reissue of:
(64) Patent No.: 6,863,724
Issued: Mar. 8, 2005
Appl. No.: 10/215,111
Filed: Aug. 8, 2002

U.S. Applications:
(60) Provisional application No. 60/311,419, filed on Aug. 9, 2001.

(51) Int. Cl.
*C01B 17/02* (2006.01)
*C04B 28/36* (2006.01)
*C09D 195/00* (2006.01)

(52) U.S. Cl. ..... 106/287.32; 106/274; 106/275; 106/285; 106/286.8; 106/287.24

(58) Field of Classification Search ..... 106/274, 106/275, 281.1, 284.05, 285, 286.8, 287.24, 106/287.32
See application file for complete search history.

(56) References Cited

U.S. PATENT DOCUMENTS

| | | | | |
|---|---|---|---|---|
| 748,019 | A | | 12/1903 | Rubitschung |
| 3,026,568 | A | | 3/1962 | Moar |
| 3,434,852 | A | | 3/1969 | Louthan |
| 3,619,258 | A | | 11/1971 | Bennett et al. |
| 3,674,525 | A | * | 7/1972 | Louthan ..... 106/287.1 |
| 3,676,166 | A | | 7/1972 | Louthan |
| 3,721,578 | A | | 3/1973 | Bennett et al. |
| 3,730,850 | A | | 5/1973 | Louthan |
| 3,738,853 | A | | 6/1973 | Kopvillem et al. |
| 3,758,035 | A | | 9/1973 | Ushiku et al. |
| 3,823,019 | A | | 7/1974 | Dale et al. |
| 3,960,585 | A | | 6/1976 | Gaw |
| 3,970,468 | A | | 7/1976 | Garrigues et al. |
| 3,997,355 | A | | 12/1976 | Santucci et al. |
| 4,026,719 | A | | 5/1977 | Simic |
| 4,144,082 | A | | 3/1979 | Simic |
| 4,155,771 | A | | 5/1979 | Cassar |
| 4,164,428 | A | | 8/1979 | Simic |
| 4,188,230 | A | | 2/1980 | Gillott et al. |
| 4,210,458 | A | | 7/1980 | Simic |
| 4,225,353 | A | | 9/1980 | Beaudoin et al. |
| 4,239,547 | A | | 12/1980 | McBee et al. |
| 4,247,336 | A | | 1/1981 | Simic |
| 4,268,572 | A | | 5/1981 | Toland |
| 4,282,040 | A | | 8/1981 | Schneider |
| 4,308,072 | A | | 12/1981 | Schneider et al. |
| 4,332,912 | A | | 6/1982 | Albom |
| 4,339,277 | A | | 7/1982 | Schult |
| 4,348,233 | A | | 9/1982 | Simic |
| RE31,575 | E | | 5/1984 | Ludwig et al. |
| 4,496,659 | A | | 1/1985 | Nimer et al. |
| 4,756,763 | A | | 7/1988 | Etnyre |
| 4,769,288 | A | | 9/1988 | Saylak |
| 5,304,238 | A | | 4/1994 | Willis et al. |
| 5,562,589 | A | | 10/1996 | Adams |
| 5,935,313 | A | | 8/1999 | Ficinski |
| 6,461,421 | B1 | | 10/2002 | Ronvak |

FOREIGN PATENT DOCUMENTS

| | | |
|---|---|---|
| GB | 1 528 384 | 10/1978 |
| SU | 202763 | 11/1967 |
| SU | 1528760 A1 | 9/1989 |
| SU | 1528760 | 12/1989 |

OTHER PUBLICATIONS

William C. McBee, "Potential and Properties of Sulfur Asphalt Paving," Fourth International Symposium, Sulphur Markets (Mar. 23-25, 1994).

G. Mohammed Memon, John G. Boone, and Brian H. Chollar, "Furfural Substitutes For Chemical Modification of Asphalt," Physical Properties Asphalt Cement Binders, STP 1241 (1995).

H.U. Bahia and D.A. Anderson, "The New Proposed Rheological Porperties of Asphalt Binders: Why Are They Required and How Do They Compare To Conventional Properties," Physical Properties Of Asphalt Cement Binders, STP 1241 (1995).

Hussain U. Bahia and David A. Anderson, "The Development of the Bending Beam Rheometer; Basics and Critical Evaluation of the Rheometer," Physical Properties Of Asphalt Cement Binders, STP 1241 (1995).

* cited by examiner

*Primary Examiner* — David M Brunsman
(74) *Attorney, Agent, or Firm* — Charles W. Stewart

(57) ABSTRACT

Sulfur, useable in as an additive to asphalt in the preparation of asphalt binders can be plasticized by addition of carbon and further treated with amyl acetate. This plasticized sulfur can be formed into solid particles and then added to asphalt as either a minority or majority component to create desired paving binder compositions. The solid plasticized sulfur has non-stick non-flow properties within a wide range of ambient temperatures, and it can be stored solid for subsequent use in paving applications.

62 Claims, 1 Drawing Sheet

SULFUR ADDITIVES FOR PAVING BINDERS AND MANUFACTURING METHODS

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit of U.S. Provisional Application No. 60/311,419, filed Aug. 9, 2001 and entitled "Sulfur Additives for Paving Binders and Manufacturing Methods," which is hereby incorporated by reference.

BACKGROUND OF THE INVENTION

1. The Field of the Invention

The present invention relates generally to plasticized sulfur materials usable in paving binder compositions and methods for manufacturing such compositions. More specifically, the present invention relates to the preparation of a plasticized sulfur composition which can be then added to asphalt and an aggregate. This plasticized sulfur material can be prepared independent of the asphalt into which it is added and can be shipped to locations where asphalt is available for preparation of a modified asphalt-based paving binder. Additionally, for remote locations where asphalt, and more particularly quality asphalt, is not readily available, this plasticized sulfur material can be mixed with asphalt and a fine mineral constituent to create a usable asphalt-based binder that will retain non-flow properties within a broad range of ambient temperatures. The present invention also relates to the methods for producing the plasticized sulfur compositions and the asphalt-based paving binders with these compositions.

2. The Relevant Technology

Paving material usually includes a binder and an aggregate. Although the binder is typically the minority component in paving materials, most of the pavement properties that relate to its longevity and performance depend on the properties of the binder.

The binder component is generally an asphalt-based composition that may include various additives. Asphalt is described as a dark brown to black cementitious material, which has a solid, semisolid or liquid consistency, and in which the predominant constituents are bitumens that occur in nature as such or which are obtained as residue in refining petroleum. Natural deposits in which asphalt occurs within porous rocks are known as rock asphalts or tar sands. Petroleum asphalt is part of the residue that is obtained in the distillation of petroleum. In particular, asphalt cement is petroleum asphalt that is refined to meet specifications for paving, industrial, and special purposes.

The aggregate component of paving material is typically any hard, inert, mineral material that is used for mixing in graduated fragments. The aggregate component may include sand, gravel, crushed stone, coral, and slag.

One of the limitations to the use of asphalt as a binder for paving materials is that it softens and flows within a wide range of ambient temperatures. This limitation makes transporting this type of conventional asphalt-based material difficult and can also give rise to serious environmental problems. Further, because of the asphalt's tendency to soften, even at ambient temperatures, modification of the asphalt by the incorporation of various additives has long been known in the art. Asphalt additives are typically used to render the binder material less flowable at ambient temperatures.

Sulfur is one of such additives that has been incorporated into the binder as a minority binder constituent. Mixing asphalt with sulfur, however, presents a number of problems. In order for the sulfur to effectively modify the asphalt, the sulfur must be effectively plasticized or polymerized. This plasticization may occur when the sulfur is mixed with the hot asphalt. However, problems with the plasticization of the sulfur often result as the liquid sulfur, liquid asphalt and aggregate are mixed.

In certain mixtures, the sulfur and asphalt can separate due to the differences in their respective densities which tend to cause an uneven dispersion of the plasticized sulfur. As a result, the sulfur-depleted portions of the binder then retain the softening and flowing properties of asphalt. Not only does the presence of sulfur-depleted portions of binder diminish the overall effectiveness of the asphalt as a binder, but handling and transporting the binder remains difficult. Chemicals such as dicyclopentidiene and heptane have also been used in an attempt to keep the sulfur homogeneously dispersed in asphalt. Further, crushed limestone has been used for this purpose. However, the use of calcium-based materials leads to the formation of calcium sulfides and polysulfides that are detrimental to the pavement longevity.

Additionally, where liquid sulfur, liquid asphalt and aggregate are mixed simultaneously or nearly simultaneously, even with other components, additional problems with the plasticization of the sulfur can occur. Specifically, where part of the liquid sulfur reacts with the aggregate before being completely plasticized by the asphalt, the nonplasticized sulfur bonds with the aggregate rather than completing its plasticization reaction. This non-plasticized sulfur works to weaken rather than strengthen the overall material strength.

Even where the final sulfur-modified asphalt binder is successfully prepared, this process requires the handling of liquid sulfur on site. The presence of liquid sulfur creates potential environmental and material handling concerns.

It has been long believed that sulfur-rich binders may detrimentally affect the quality and longevity of the paving material. In addition, sulfur has been viewed as a constituent that would unacceptably increase the cost of binder materials to the point of rendering them prohibitively expensive if the amount of sulfur in the binder exceeded a certain limit.

In addition to economic considerations regarding the use of sulfur as an additive in paving binders, the use of asphalt is also related to economic factors. For example, the use of asphalt as the major constituent in paving binders is negatively affected by the often fluctuating petroleum production patterns. Further, limited petroleum supplies may threaten, in the long term, the viability of paving binders in which asphalt is a major constituent. Profitable utilization of petroleum products is another factor that detrimentally affects the use of asphalt as a majority constituent in paving binders. For example, maintaining, renovating and protecting the surfaced highways and streets in the United States requires approximately thirty (30) million tons of asphalt cement annually. Asphalt cement was available in the past at a reasonable cost because asphalt cement is a residue in petroleum refining and certain petroleum refining residues could only be economically utilized for the production of asphalt cement. However, higher percentages of petroleum are utilized nowadays for the production of other more profitable forms of petroleum products. As this trend continues, the price of asphalt cement is expected to increase even under constant demand. This expectation is supported by the evolution of the average price of asphalt cement over the past thirty-two years, a period during which the price has risen from approximately $23/ton in 1968 to approximately $152/ton in 2000 (through February), an increase of about 561%. It is generally recognized, however, that there is currently no economical paving binder that can be substituted for asphalt cement, and that there is no low priced asphalt paving binder that can effectively replace high priced asphalt paving binders.

Therefore, there is a need to be able to provide a solid, pre-plasticized sulfur which can be readily mixed with the asphalt to effectively modify the asphalt. Such a pre-plasticized sulfur modifier can reduce the complexity of binder preparation, eliminate the need for handling liquid sulfur in conjunction with liquid asphalt, and provide increased uniformity of binder without concern that non-plasticized sulfur may weaken the paving material. Further, the ability to transport the solid, pre-plasticized sulfur additive material that is in the form of a smaller sized, non-sticky, non-flowing, and non-melting material facilitates the delivery of the pre-plasticized sulfur additive materials to locations where it can be readily mixed with asphalt to create a material acceptable for the specific project specifications. It is desirable to manufacture a binder additive that incorporates pre-plasticized sulfur and which remains in solid, non-sticky, non-flowing and non-melting form over a wide range of ambient temperatures, so that such binder additive can be conveniently transported over long distances by conventional means of transportation for common solids.

Accordingly, there is also a need for improved paving binders which, while still utilizing asphalt, that provide increased performance over asphalt alone. These paving binders should be readily made by incorporating additives into the asphalt. These additive materials would include the following characteristics. First, these additive materials come ready to use without the need of further reaction or modification. These additive materials can also be manufactured in forms that are non-sticky, non-melting, and non-flowing within a wide range of ambient temperatures at which storage and transport is effectuated. Additive materials with these non-sticky, non-flowing, and non-melting properties can be conveniently transported over long distances while avoiding pollution problems that would derive from the emissions and spills of other forms of binders that soften and flow at ambient temperatures. Second, when utilized, these additive materials should substantially reduce the quantity of asphalt in the final paving binders to reduce petroleum dependency and cost. Third, the additives used in the paving binders should not substantially incorporate constituents that, whether directly or when combined with other binder constituents, are known to detrimentally affect the quality and longevity of the pavement.

It is also desirable to manufacture finished plasticized sulfur plus asphalt-based binder compositions in which the sulfur is a majority component and which can be readily shipped to remote locations because the composition remains in solid, non-sticky, non-flowing, and non-melting form over a wide range of ambient temperatures. This material also should impart improvements to the pavement's performance and strength.

BRIEF SUMMARY OF THE INVENTION

The present invention has been developed in response to the present state of the art and, in particular, in response to problems and needs that have not been solved heretofore.

In accordance with the invention as embodied and broadly described herein, liquid sulfur is plasticized by the addition of carbon at a concentration of at least 0.25% and the plasticized sulfur can be further treated with amyl acetate at a concentration of at least about 0.08% and to produce an even more manageable plasticized sulfur additive. Once the plasticized sulfur is prepared it can be formed into usable solid particles, typically small particles such as pellets or briquettes. These solid particles do not flow or melt and do not stick at temperatures within a wide range of ambient temperatures and, consequently, can be readily shipped to any given location where they can then be mixed with hot asphalt cement to create a modified asphalt-based binder hot mix paving material.

Likewise, once prepared, the plasticized sulfur can be mixed (either immediately or after being formed into solid particles) as a majority component with an asphalt-based material and a fine mineral constituent such as fly ash or fine silica to create a complete binder material, which sulfur-rich binder material can itself be formed into usable solid particles, typically small particles such as pellets or briquettes. This sulfur-rich solid binder material does not flow or melt and docs not stick at temperatures within a wide range of ambient temperatures. Consequently, the sulfur-rich solid binder can be readily shipped to any given location where it can be mixed with any given aggregate without the need to ship either the liquid asphalt or liquid sulfur. These and other objects, features, and advantages of the present invention will become more fully apparent from the following description, drawings, and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to the manufacture and use of a plasticized sulfur additive which can be used to create improved asphalt or hydrocarbon-based paving binders. The plasticized sulfur additive according to the present invention is prepared by the addition of carbon which serve to plasticize (or polymerize) the liquid sulfur. Further, amyl acetate can also be added to the composition to improve the handling and odor characteristics of the plasticized sulfur. This plasticized sulfur can then be mixed with various concentrations of an asphalt-based material during the mixing cycle with aggregate, sand or other materials to create the desired product characteristics.

Once created, the plasticized sulfur additive can be formed into pastilles, slates, pellets, chips, briquettes or other small forms of product that are suitable for storage and transportation at ambient temperature because of their non-flow, non-melt, and non-stick properties within a wide range of ambient temperatures. This allows for the solid product to be stacked or piled without concern that the individual pastilles, slates, pellets, chips or briquettes will fuse or otherwise stick together and create a single, unmanageable mass of product. The finished plasticized sulfur additive according to the present invention can be stored at the production site or at a remote site and can be transported and stored in piles or within containers such as sacs, tanks, and barrels while the individual small forms of finished product remain loose and non-sticky and devoid of the emissions that liquid sulfur would generate.

Figure 1:
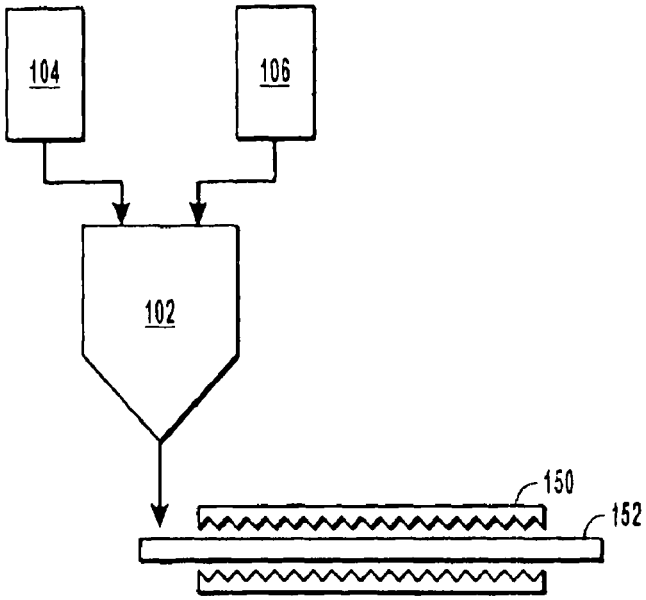
FIG. 1 is a schematic block diagram of one embodiment of the methods for producing a plasticized sulfur additive material to be used in the production paving binders according to the present invention.

FIG. 1 schematically shows a flow diagram of one possible preferred embodiment of a process for manufacturing a plasticized sulfur additive material for use in paving binders according to the present invention. In this embodiment, the plasticized sulfur additive material comprises sulfur, which is placed into a mixing tank 102 and heated to form liquid sulfur; carbon, which is stored as feed material in container 104; and amyl acetate which is stored as feed material in container 106. It is understood that containers 104 and 106 are appropriately configured for the storage and delivery of carbon and amyl acetate respectively and that mixing tank 102 is appropriately configured to allow for the mixing of the sulfur, carbon and amyl acetate therein. Accordingly, these tanks can be provided with stirrers and heating systems that are not shown in the embodiment depicted in FIG. 1 because the melting point of sulfur is well known and the devices for melting and keeping these substances at the appropriate temperatures and mixing them are also well known in the art.

In one embodiment, the sulfur utilized is, by way of example and not limitation, preferably elemental sulfur, which can be commercial grade, crystalline or amorphous. By way of example and not limitation, sources that provide sulfur suitable for the compositions and methods of the present invention include primary sulfur sources and recovered sulfur sources.

Carbon, also known as carbon black, is also available from multiple sources. In one presently preferred embodiment, again by way of example and not limitation, particle or fibrous type carbon material found in natural occurring, mined carbon black may be used. In addition, another possible source of carbon is manufactured carbon, such as the material created during combustion, or carbon synthetically reacted. Examples of such carbon include natural carbon material, fuel residue material, and carbon 60 through carbon 69, known as bucky balls.

Likewise, one skilled in the art will recognize that amyl acetate is readily available in commercial form, and that while relatively pure forms of amyl acetate are, in one embodiment, most preferable, that it is within the scope of the present invention to utilize amyl acetate added to the sulfur in conjunction with other compounds including acetate-containing organic compounds.

In one embodiment of the present invention, depicted in FIG. 1, the sulfur held in the mixing tank 102 is preferably maintained at a temperature sufficient to bring or keep the sulfur in liquid form, e.g. between approximately about 120° C. to about 150° C. Whether the sulfur is delivered into the mixing tank 102 as a solid or liquid form is simply a matter of convenience. As known in the art, fluid materials such as liquid sulfur can be circulated as such fluids by maintaining the appropriate temperature and pressure conditions in the pipes. These conditions are achieved in most environments by properly insulating or heat tracing the pipes through which these liquids circulate. Other measures that can be adopted to achieve the same goal are well known in the art.

Carbon from container 104 is added to mixing tank 102 at a concentration of at least about 0.25%. While any concentration of carbon black above about 0.25% can create the desired polymerizing effect on the sulfur, excess carbon can increase the overall binder cost. Consequently, a preferred concentration of carbon would be between about 0.25% to about 5%, with a more preferred concentration from about 0.25% to about 1.0%, and an even more preferred concentration from about 0.4% to about 0.8%. The carbon facilitates the plasticization reaction with the sulfur. Additionally, the carbon creates an ultraviolet light shield which helps to prevent ultraviolet degradation of the final asphalt plus aggregate product. As previously stated, this percentage is a weight percent of the carbon in the final plasticized sulfur composition.

The amyl acetate held in container 106 will preferably be added to the sulfur/carbon mixture and will also be maintained at ambient temperature. Therefore, it is preferred that the amyl acetate in container 106 be held at ambient temperature range. FIG. 1 illustrates that in this embodiment the amyl acetate from container 106 also feeds into mixing tank 102. In one embodiment, it is preferred that the amyl acetate will be added to the sulfur at a concentration of at least about 0.08% to help eliminate or at least reduce unwanted odors from the product and thereby improve its overall handling. As previously stated, this percentage is a weight percent of the amyl acetate in the final plasticized sulfur composition. While any concentration of amyl acetate above about 0.08% can create the desired effect on the plasticized sulfur product, excess amyl acetate can increase the overall binder cost. Consequently, a more preferred concentration would be between about 0.1% to about 1.5%, and an even more preferred concentration would be from between about 0.2% to about 0.4%.

During the addition of the amyl acetate and the carbon (which can occur simultaneously or in any sequential order), the liquid sulfur in mixing tank 102 is stirred or otherwise mixed until the reaction becomes complete at which point the amyl acetate and carbon will have created plasticized sulfur. Visual observation of a change of the liquid sulfur from a light color to a gray or black (depending on the concentration of carbon added) provides an easy method for determining the completion of the reaction. Typically, the reaction time will be between about a half minute to about 5 minutes once both the carbon and amyl acetate have been added.

Further, while the above description of the process as illustrated in FIG. 1 shows a batch process, one skilled in the art will recognize that a continuous process will produce the same result and is encompassed within the scope of the present invention.

Once the plasticization of the sulfur has occurred, the plasticized sulfur can then either be immediately mixed with a hydrocarbon-based material such as asphalt, to produce the desired pavement, forming and structure material or composite binder, or be formed into any type of relatively small, solid particles and shipped to any given location to be used at a latter time to create the desired binder. These relatively small, solid particles could include, by way of example and not limitation, pastilles, slates, pellets, chips, briquettes or other forms of product that are suitable for storage and transportation. In one embodiment, these forms of finished plasticized sulfur additive material have a smaller manageable size. By way of example only, in one embodiment, the finished plasticized sulfur additive material are sized so that each unit exposes a surface area within the range from about 0.25 $in^2$ to about 4 $in^2$. It is contemplated that various other sizes and forms of finished plasticized sulfur additive material may be produced.

FIG. 1 also illustrates, by way of example and not limitation, how the plasticized sulfur material can be formed into in a variety of solid forms that include, for example, pastilles, slates, pellets, chips, briquettes or other forms of finished paving binder product that are suitable for storage and transportation. Slates and chips are formed according to the embodiment shown in FIG. 1 by circulating the plasticized sulfur produced in mixing tank 102 through a cooling system 150, so that the fluid hardens as it is transported by conveyor 152 into a brittle material that subsequently breaks or is chopped into discrete units, including units with a fairly small size described above. Pastilles may be formed by subjecting the fluid obtained from mixing tank 102 to known pastille-making processes such as rotoforming, and processing with pastille making devices such as the devices known by the name AccuDrop and Sandvik rotoformer. Pellets are formed by subjecting the fluid obtained from mixing tank 102 to treatment with conventional pelletizers. Flakes are formed by subjecting the fluid obtained from mixing tank 102 to treatment with conventional devices such as a rubber, composite, or metal belt.

Whether the plasticized sulfur is formed into small particles for shipment or immediately added to the asphalt constituents to create the desired material, the process for combination of the asphalt and plasticized sulfur is the same.

By way of example and not limitation, asphalt is the preferred hydrocarbon-based material into which the plasticized sulfur is mixed according to the present invention, and asphalt cement is the presently preferred form of hydrocarbon-based material used in the embodiments of paving binder according to the present invention. Asphalt cement is commonly abbreviated with the terms AC-xx asphalt, and it is provided by petroleum companies. The notation "xx" in the description of an AC asphalt represents a numeral related to the asphalt viscosity. Asphalts such as AC-20 and AC-10 asphalts are preferred forms of asphalt to be used as hydrocarbon-based material according to the present invention. Other forms of asphalt that are envisaged as constituents in paving binder formulations according to the present invention include, by way of example and not limitation, AC-1.75, AC-2.5, AC-5, AC-30, AC-40, AC-80, and AC-120 asphalts. Other hydrocarbon-based materials that are envisaged as constituents in paving binder formulations according to the present invention include, by way of example and not limitation, heavy crude oil, fuel oil, and mixtures of substances such as heavy crude oil and fuel oil with at least one of the AC asphalts referred to above.

The use of the AC-xx grading system to designate exemplary embodiments of asphalt that can be used in the context of the present invention is provided as an example and is not intended to limit the types of asphalt to this particular grade. Asphalt characterized according to other designations, such as PG grades are also envisaged with the scope of hydrocarbon-based materials according to the present invention. Furthermore, substances such as bitumen and gilsonite are also envisaged as examples of hydrocarbon-based materials in the context of the present invention.

It is envisaged that paving binders according to the present invention can also be prepared with other hydrocarbon-based materials in which asphalt is the majority component added to the plasticized sulfur mixture. These hydrocarbon-based materials include, by way of example and not limitation, products resulting from mixtures of asphalt and tall oil pitch, mixtures of asphalt and cyclic saturated hydrocarbons, mixtures of asphalt and cyclic unsaturated hydrocarbons, mixtures of asphalt and polycyclic saturated hydrocarbons, mixtures of asphalt and unsaturated polycyclic hydrocarbons, and mixtures of asphalt and tar.

Other hydrocarbon-based materials that are envisaged as constituents in paving binder formulations according to the present invention include, without limitation, the products of mixtures of at least one of the asphalts referred to above and polymeric or polymerizable materials in which asphalt is the majority component added to the plasticized sulfur mixture. Examples of such polymeric or polymerizable materials include, by way of example and not limitation, styrene monomer (vinyl toluene), polyethylene terephthalate (PET), ethyl vinyl acetate (EVA), Exxon 101, and Exxon 103, which are proprietary materials, or other vinyl aromatics.

Still other hydrocarbon-based materials that are envisaged as constituents in paving binder formulations according to the present invention include, by way of example only, the products of mixtures of at least one of the AC asphalts referred to above and at least one heterocyclic compound such as furan, dihydrofuran, and derivatives of such heterocyclic compounds, where asphalt is the majority component added to the plasticizes sulfur mixture. In addition to furan and dihydrofuran, these heterocyclic compounds include furfural, and 3-(2-furyl) acrolein.

Other hydrocarbon-based materials that are envisaged as constituents in paving binder formulations according to the present invention include the products of mixtures of at least one of the AC asphalts referred to above and at least one aliphatic, olefinic or aromatic substance.

In order to combine the plasticized sulfur with the hydrocarbon-based asphalt material to create the desired binder or final product, both the plasticized sulfur and the asphalt must simply be liquefied and mixed with aggregate. This mixing and liquefying of the plasticized sulfur with the asphalt and aggregate can be accomplished in almost any order of mixing. For example, it can be accomplished by combining the plasticized sulfur with the asphalt followed by the combination sulfur-asphalt binder with the aggregate as well as by initially combining the asphalt and aggregate followed by the plasticized sulfur as well as by a combination of all three elements at once.

Where asphalt is relatively accessible, the plasticized sulfur can be shipped to the specific location and mixed with the asphalt to create the desired paving material. Typically, the plasticized sulfur will be added to the asphalt at not much more than a 50% weight percentage concentration and in the presently preferred embodiment, the plasticized sulfur will constitute between about 20% and 60% of the final binder material. While it is generally believed or recognized that a concentration of less than 20% plasticized sulfur provides little strength enhancement or modification to the asphalt, the plasticized sulfur can still be utilized at concentrations less than 20% in order to extend the amount of asphalt required.

One skilled in the art will recognize that the typical hot mix plant components capable of heating asphalt into liquid form and mixing the liquefied asphalt with aggregate will allow simple addition of the solid plasticized sulfur particles into the asphalt for creation of the desired final paving binder. Further, the scope of the present invention additionally extends to the use of the plasticized sulfur in conjunction with other additive and/or modifiers used with a given asphalt to produce a desired binder.

Another use for the plasticized sulfur is in the creation of a complete binder composition which itself can be added directly to aggregate without requiring any additional materials, such as asphalt. This complete binder composition is particularly useful for applications in more relatively remote locations where supplies of asphalt, and more particularly quality asphalt, may not be readily available, or where shipment of asphalt is difficult. In order to create this complete binder composition, the plasticized sulfur can be mixed as a majority component with asphalt and a fine mineral constituent to produce a final sulfur-rich paving binder which has the necessary hot mix properties. This sulfur-rich paving binder also possesses the non-stick and non-flow properties at temperatures within a wide range of ambient temperatures which allow it to be effectively shipped to any given location.

Figure 2:
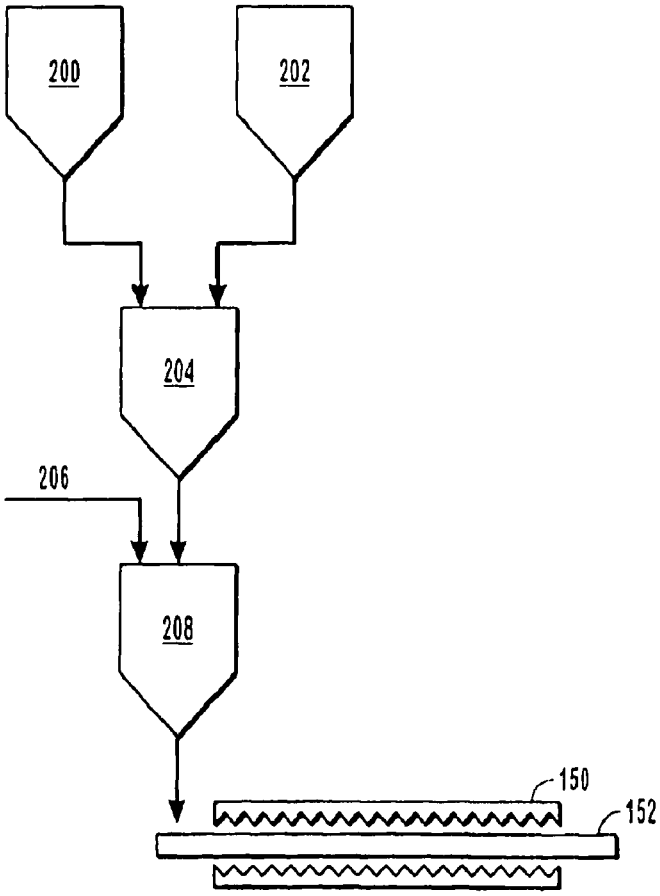
FIG. 2 is a schematic block diagram of one embodiment of the methods for producing a sulfur-rich binder material.

One possible embodiment of a process to create this sulfur-rich paving binder according to the present invention, as schematically shown in FIG. 2, displays a configuration of devices to first mix asphalt (from tank 200) and a fine mineral constituent (from tank 202) into tank 204. Subsequently the plasticized sulfur (from input pipe 206) can be introduced into the asphalt/mineral constituent combination and the final product mixed in tank 208. The plasticized sulfur could be introduced directly from the mixing tank 102 of FIG. 1 or may be solid or reliquified plasticized sulfur particles. Mixing at each stage takes place to an extent that is sufficient to thoroughly interdisperse the constituents in each mixture. Once complete, the final sulfur-rich paving binder material can be made into solid particles through the same or similar process as discussed above in reference to FIG. 1.

In other embodiments of this invention the plasticized sulfur, asphalt and fine mineral constituent are mixed simultaneously together. Regardless of the order of introduction of materials, one skilled in the art will recognize that in order to liquefy and adequately mix the asphalt with the plasticized sulfur, these materials will need to be heated and maintained in suitable vessels at a temperature range of about 93° C. (about 200° F.) to about 204° C. (about 400° F.) for a sufficient time to ensure thorough mixing and interaction of the constituents. More preferably, the temperature range in which sulfur, asphalt, and fine mineral constituents are mixed together in a suitable vessel or apparatus is in a temperature range of about 121° C. (about 250° F.) to about 160° C. (about 320° F.). Most preferably, the temperature range is from about 132° C. (about 270° F.) to about 149° C. (about 300° F.). These ranges of mixing temperatures also apply to the temperatures at which constituents are mixed in mixing unit 200 Depending on the composition and characteristics of the constituents, mixing in this batch mode can take about 15 minutes, and in any case, mixing is performed until the constituents are thoroughly interdispersed in the mixture and a gel is formed.

Fly ash is a finely divided mineral residue that is obtained as a waste in power plants that burn pulverized bituminous coal. Coal consuming electrical power plants are a prime producer of fly ash in the United States. These plants have to dispose of an enormous amount of fly ash every year, which increases the costs of producing electricity and also generates disposal problems. The paving binders and manufacturing methods of the present invention effectively absorb the fly ash that is produced in plants that generate electricity by burning coal, and use the fly ash as a constituent in paving binders. While fly ash is the preferred fine mineral constituent of the paving binder of the present invention, final paving binders can also be made according to the methods of the present invention with another fine mineral constituents, such as silica-based materials, and in particular with silica material and with mixtures of fly ash and silica material. Although fine mineral constituents with a wide range of particle size can be used in the paving binders and the manufacturing methods according to the present invention, a particle size characterized by the fraction that passes through a sieve with a mesh number 200 or finer is preferred, such as, by way of example and not limitation, silica flour. Examples of such fine mineral constituents are type A silica material, type silica material, and type F fly ash, and a ceramic clay such as kaolin.

Such a final sulfur-rich paving binder material would contain at least 60% plasticized sulfur and at least 10% of asphalt and at least 10% of the fine mineral constituent. In the presently preferred embodiment a composition of 70% plasticized sulfur, 15% asphalt and 15% fly ash have been found to produce the desired results. Once the plasticized sulfur, asphalt and fly ash have been thoroughly combined, this final paving binder material can itself be formed into any desired solid particle as already described in FIG. 1. Again, while a batch process is shown in FIG. 2, one skilled in the art will recognize that a continuous process is also within the scope of the present invention. Further, while the embodiment shown in FIG. 2 utilizes a process where the asphalt and fine mineral constituent are initially mixed prior to addition of the plasticized sulfur, the order of mixing these components is not critical to the invention and whether these components are mixed together in a different order or all simultaneously together, the same type of product will be produced.

It is understood that material flow lines in the diagram shown in FIGS. 1 and 2 are, in practice, embodied by an auger system or equivalent device when the rheology of the circulating fluid requires such devices to cause or facilitate the circulation. Furthermore, material flow line connections in the embodiment sketched in FIGS. 1 and 2 are built with the suitable ports that are known in the art. For example, the fluid mixture produced in mixing unit 204 may be fed into the liquid plasticized sulfur through a conventional vortex injector port.

Suitable combinations of compacting, crushing, comminuting devices and other devices to further control and standardize the size of the plasticized sulfur material can be implemented instead of or in addition to conveyor 152 and cooling system 160 shown in FIG. 1.

In one embodiment of the process for making either the solid plasticized sulfur particles or final sulfur-rich paving binder materials according to this invention, cooling system 160 (shown in FIG. 1) is a water-based cooling system, including water baths and a water flow systems, such as a water sprinkling system, that lowers the temperature of the fluid feed produced in tank 102 or 208 as it is transported by conveyor 152. In one embodiment, the water based cooling system is configured in a way such that the cooling water is not substantially in direct contact with either the plasticized sulfur or final sulfur-rich paving binder composition. This configuration can be achieved, for example, by circulating either the plasticized sulfur or final paving binder composition obtained from tank 102 or 208 along a conveyor, so that the outer bottom portion of the conveyor is in contact with the cooling water. Heat is then transferred from the binder composition within the conveyor to the cooling water through the conveyor material. Examples of conveyors that are used in the context of this invention include U-shaped conveyors, flat conveyors, stainless steel belt conveyors, and rubber conveyors. In addition, a fan or plurality of fans can also be used as part of the cooling system. Depending on the specific embodiment of the cooling system and how either the plasticized sulfur or final paving binder composition from tank 102 or 208 is fed to it, solidification is typically achieved in about 1 minute to 10 minutes.

In one embodiment of the present invention, fluid feed produced in tank 102 or 208 is fed to a palletizing unit, such as a palletizing drum unit, to produce solid particles in the form of pellets.

Embodiments of the plasticized sulfur particles produced according to the present invention have excellent non-flow behavior at temperatures below about 77° C. (about 170° F.), and no agglomeration of the individual units, such as pastilles, slates, pellets or other forms, of the paving binder of this invention have been observed at temperatures as high as about 79° C. (about 175° F.). Although the melting point of the paving binder of the present invention depends on the composition of each embodiment, the melting point is generally above about 93° C. (about 200° F.).

Embodiments of the final sulfur-rich paving binder shown in FIG. 2 where the plasticized sulfur constitutes a majority of the overall product composition produced according to the present invention have excellent non-flow behavior at temperatures below about 77° C. (about 170° F.), and no agglomeration of the individual units, such as pastilles, slates, pellets or other forms, of the paving binder of this invention have been observed at temperatures as high as about 79° C. (about 175° F.). Although the melting point of the paving binder of the present invention depends on the composition of each embodiment, the melting point is generally above about 82° C. (about 180° F.).

The plasticized sulfur or final sulfur-rich paving binder composition produced according to the compositions and methods of the present invention are high strength, durable, low cost products that can be stored for future use in paving applications. The plasticized sulfur or final sulfur-rich paving binder composition according to the present invention achieve high strength in the aggregate mixture upon cooling to ambient temperatures and the strength further increases upon aging. A possible explanation of this increase in strength upon aging is believed to be based on solid state nucleation and growth of sulfur crystals in the material. Furthermore, the plasticizer effects of these materials are believed to impede the development of crystals whose presence would be detrimental to the pavement into which binder with such crystals had been incorporated.

The strength of embodiments of the plasticized sulfur or final sulfur-rich paving binder composition according to this invention is already very high upon solidification, reaching generally about 80% of the ultimate strength after a period of about 24 hours after solidification. The resulting strength permits the various embodiments of the paving binder of this invention to be stored in stockpiles up to approximately 12 m (40 feet) high.

The strength of embodiments of the plasticized sulfur or final sulfur-rich paving binder composition according to the present invention also provides excellent resistance to thermal cracking. As discussed more extensively below, thermal cracking is the predominant failure mode at temperatures near and below 0° C., and pavement resistance to thermal cracking depends mostly on the resistance to thermal cracking of the binder that is utilized in the pavement manufacture. Because of the high internal strength of the paving binder of the present invention, resistance to thermal cracking of pavements that incorporate paving binder according to the present invention is also high.

The plasticized sulfur or final sulfur-rich paving binder composition of the present invention is manufactured and delivered to the hot-mix plant in any one of the solid forms discussed herein above in lieu of the conventional hot liquid state. Embodiments of the final paving binder composition of the present invention may also be used in a hot-mix plant by introducing them through the recycled asphalt pavement collar in a drum hot-mix plant or pug mill in a batch process hot-mix plant, thus reducing the need for hot asphalt storage and heating. Consequently, emissions from hot asphalt are also reduced.

The compositions and manufacturing methods of the present invention permit the effective use of fly ash and sulfur supplies that would otherwise present disposal problems. For example, sulfur is a by-product from petroleum refining and natural gas processing that is obtained to offer fuels that comply with environmental regulations and specifications for other manufacturing processes. Recovered sulfur production has increased steadily over the past twenty-five years and currently is creating an imbalance between sulfur supply and demand which results in an excess of available sulfur. Because of this imbalance and future recovery operations, and in contrast with the prices expected regarding the price of asphalt, the price of sulfur is expected to follow a decreasing trend. Since 1970, the cost of recovered sulfur has remained below 56% of the price of asphalt, a cost ratio that is considered the break-even point for substitution of asphalt for sulfur. A significant price differential currently exists with the average price of recovered sulfur approximately 35% of the price of asphalt. These average prices are obtained from surveys, which report generally widely varying prices depending on location.

The foregoing discussion of the prices of asphalt and sulfur and their respective expected trends indicate that the present invention solves the compositional and manufacturing problems of a new form of paving binder. This solution is such that it beneficially utilizes the economic factors regarding the objection of asphalt and sulfur.

The finished plasticized sulfur or final sulfur-rich paving binder composition products can subsequently be stored at or near the production site or at a remote site, it can be used alone or in combination with additional paving material at road sites, and it can be shipped to a hot mix plant where the plasticized sulfur or final sulfur-rich paving binder composition of this invention is mixed with additional paving materials to manufacture asphalt pavements and surface treating materials. Among the asphalt pavements, asphalt concrete is a high quality, thoroughly controlled hot mixture of asphalt cement and well-graded, high quality aggregate that is thoroughly compacted into a uniform dense mass.

Embodiments of the plasticized sulfur or final sulfur-rich paving binder composition according to the present invention each have a very long shelf life in storage sites because of the solid nature of these embodiments and the lack of a temperature control system. Furthermore, the final sulfur-rich paving binder composition embodiments are a convenient choice of binder to be used at remote sites because transporting liquid asphalt to remote sites is generally expensive and difficult. Embodiments of the plasticized sulfur or final sulfur-rich paving binder composition according to the present invention can be shipped conventionally by rail, truck, ship or air over long distances, such as by transatlantic and transcontinental shipments. Embodiments of the plasticized sulfur or final sulfur-rich paving binder composition according to the present invention provide for safer transportation of these materials because of their solid nature, thus eliminating the risk of hot asphalt transportation spills.

The use of the plasticized sulfur to modify asphalt in the hot-mix plant in preparation of the embodiments of the paving binder according to the present invention reduces the need for stability testing during the hot-mix design process because the paving binder produced by the mixture of the plasticized sulfur and asphalt creates a mix with stabilities that are higher than conventional sulfur-modified asphalt. Furthermore, because of the ongoing compatibility of the constituents introduced by the paving binder and the other elements in the hot mix, the stabilities continue to increase over time without losing hot and cold temperature properties. Hot-mix stability, however, is not a design characteristic that can be conveniently measured. As a result, the hot mix is typically designed for voids and workability, using conventional designs, such as Marshall, Hveem and Super pave, as starting point.

EXAMPLES

To date, numerous plasticized sulfur compositions have been prepared then mixed with various types of asphalt and tested to develop and to offer exemplary embodiments of the present invention. Below are specific examples of plasticized sulfur compositions and tests of mixtures of plasticized sulfur plus asphalt (and in some cases plus fine constituent material) compositions which are then mixed with aggregate material to form asphalt cement and other paving materials. Additionally, a number of hypothetical, or "prophetic", examples have been included based on actual paving binder compositions that have been designed or which would be expected, based on experience, to possess the properties described hereinafter. The actual examples are written the past tense, while the hypothetical examples are written in the present tense in order to distinguish between the two.

Example 1

Sulfur was heated and liquefied at a temperature of 140° C. (about 284° F.). The liquefied sulfur was treated with 0.25% amyl acetate and 0.5% carbon and within about five minutes the composition turned a shiny dark gray color indicating completion of the plasticization reaction of the sulfur. This plasticized sulfur was then cast into slate approximately 0.63 cm (about 0.25 in) thick. After cooling, the slate was broken up into pieces not bigger than forms which would have their length and width approximately equal to their thickness. AC-20 asphalt cement, aggregate and the plasticized sulfur were mixed with the overall composition of the asphalt cement containing approximately 2.7% AC-20 asphalt cement, 3.0% plasticized sulfur and 94.3% aggregate, and the mixture was found to have a stability of over 5400 pounds and a flow of 12 at 50 blows.

Example 2

Plasticized sulfur was prepared as described in Example 1. AC-20 asphalt, aggregate and the plasticized sulfur were mixed with the overall composition of the asphalt cement containing approximately 2.0% AC-20 asphalt, 2.0% plasticized sulfur and 96% aggregate, and the mixture was found to have a stability of over 5800 pounds and a flow of 12 at 50 blows.

Example 3

Plasticized sulfur was prepared as described in Example 1. AC-10 asphalt, aggregate and the plasticized sulfur were mixed with the overall composition of the asphalt cement containing approximately 3.0% AC-10 asphalt, 1.5% plasticized sulfur and 95.5% aggregate.

Example 4

Plasticized sulfur was prepared as described in Example 1. Subsequently 70% plasticized sulfur, 15% type F silica flour, and 15% AC-10 asphalt cement were mixed together for about three minutes at about 140° C. (about 284° F.) and then cast into slate approximately 0.63 cm (about 0.25 in) thick. After cooling, the slate was broken up into pieces not bigger than forms which would have their length and width approximately equal to their thickness. This sulfur-rich paving binder is mixed with graded mineral aggregate in relative amounts of about 5% of sulfur-rich paving binder and 95% of aggregate, and the mixture was found to have a stability of about 5000 pounds and a flow of about 8 at 2 blows.

Example 5

A sulfur-rich paving binder was prepared as described in Example 4. This sulfur-rich paving binder is mixed with graded mineral aggregate in relative amounts of about 10% of sulfur-rich paving binder and 90% of aggregate, and the mixture was found to have a stability of about 10000 pounds and a flow of about 8 at 2 blows.

Example 6

Plasticized sulfur was prepared by adding 0.25% carbon and 0.1% amyl acetate to liquefied sulfur at 140° C. (about 284° F.). Within less than three minutes the composition turned a shiny gray color indicating completion of the plasticization reaction of the sulfur.

Example 7

Plasticized sulfur is prepared by adding 1.5% carbon and 1.0% amyl acetate to liquefied sulfur at 140° C. (about 284° F.). Within less than three minutes the composition turns a dark gray color indicating completion of the plasticization reaction of the sulfur.

Example 8

A sulfur-rich paving binder composition was prepared as described in Example 4 with 70% plasticized sulfur, 15% fly ash, and 15% AC-10 asphalt.

Example 9

Plasticized sulfur is prepared by adding 1.5% carbon to liquefied sulfur at 140° C. (about 284° F.). Within less than three minutes the composition turns a dark gray color indicating completion of the plasticization reaction of the sulfur.

Example 10

This example describes a set of formulations that refer to a variety of asphalt cement types. Compositions such as those described in the foregoing examples in which the asphalt constituent is AC-10 or AC-20 asphalt are prepared with at least one of AC-1.75, AC-2.5, AC-5, AC-30, AC-40, AC-80, and AC-120 graded asphalts replacing AC-10 and AC-20 asphalts at the concentrations described in the foregoing Examples.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

[1. A plasticized sulfur product, comprising:

a plasticized sulfur composition obtained by mixing liquid sulfur with carbon and amyl acetate, wherein at least a portion of said liquid sulfur is plasticized.]

[2. A plasticized sulfur product according to claim 1 wherein said carbon is added at a weight percent concentration above about 0.25%.]

[3. A plasticized sulfur product according to claim 1 wherein said carbon is added at a weight percent concentration between about 0.25% and about 1.0%.]

[4. A plasticized sulfur product according to claim 1 wherein said carbon is added at a weight percent concentration between about 0.4% and about 0.8%.]

[5. A plasticized sulfur product according to claim 1 wherein said amyl acetate is added at a weight percent concentration above about 0.08%.]

[6. A plasticized sulfur product according to claim 1 wherein said amyl acetate is added at a weight percent concentration between about 0.1% and about 1.5%.]

[7. A plasticized sulfur product according to claim 1 wherein said amyl acetate is added at a weight percent concentration between about 0.2% and about 0.4%.]

8. A process [for plasticizing sulfur], comprising:

[mixing] *making solid particles of a plasticized sulfur composition by forming a mixture consisting essentially of* liquid sulfur [with] *and a* carbon and allowing said sulfur to polymerize *to form said solid particles*.

9. A process [for plasticizing sulfur] according to claim 8 wherein said sulfur[,] is maintained *during the forming step* at a temperature of between about 120° [F] *C*. and about 150° [F] *C*.

10. A process [for plasticizing sulfur] according to claim 8 wherein said process further comprises cooling said plasticized sulfur into *said* solid particles.

11. A process [for plasticizing sulfur] according to claim 10 wherein said solid particles exhibit no agglomeration at temperatures under 175° F.

12. A sulfur-rich paving binder obtained by mixing the substances comprising:

(a) hydrocarbon-based material;

(b) a fine mineral constituent; and (c) a plasticized sulfur product obtained by [mixing] *forming a mixture consisting essentially of* liquid sulfur [with] *and* carbon and allowing said *liquid* sulfur to polymerize.

13. A sulfur-rich paving binder according to claim 12 wherein said plasticized sulfur *product* is incorporated into the [mixture] *sulfur-rich paving binder* in a weight percentage of at least 60%.

[14. A sulfur-rich paving binder according to claim 12 wherein said fine mineral constituent comprises at least one of the materials in the group consisting of fly ash, silica material, and mixtures thereof.]

15. A sulfur-rich paving binder [according to claim 12] *obtained by forming a mixture by mixing the substances comprising a hydrocarbon-based material; a fine mineral constituent; and a plasticized sulfur product obtained by mixing liquid sulfur with a plasticizer consisting essentially of carbon and allowing said sulfur to polymerize* wherein said plasticized sulfur *product* is incorporated into [the] *said* mixture in a weight percentage of [about 70%] *at least 60%*, said hydrocarbon-based material is incorporated into [the] *said* mixture in a weight percentage of [about 15%] *at least 10%* and said fine mineral constituent is incorporated into the mixture in a weight percentage of [about 15%] *at least 10%*.

[16. A sulfur-rich paving binder according to claim 15 wherein said solid particles exhibit no agglomeration at temperatures under 175° F.]

17. A sulfur-rich paving binder according to claim 12 wherein said *sulfur-rich paving* binder is formed into solid particles.

[18. A sulfur-rich paving binder according to claim 12, wherein the plasticized sulfur product further comprises amyl acetate, wherein the amyl acetate improves the handling and odor characteristics of the plasticized sulfur product.]

19. A paving product obtained by mixing substances comprising:

(a) a plasticized sulfur product obtained by [mixing] *forming a mixture consisting essentially of* liquid sulfur [with] *and* carbon and allowing said *liquid* sulfur to polymerize; and (b) hydrocarbon-based material.

[20. A sulfur-rich paving binder according to claim 19, wherein the plasticized sulfur product further comprises amyl acetate, wherein the amyl acetate improves the handling and odor characteristics of the plasticized sulfur product.]

*21. A sulfur-rich paving binder obtained by forming a mixture by mixing*

*(a) a hydrocarbon-based material;*

*(b) a fine mineral constituent; and*

*(c) a plasticized sulfur product obtained by mixing liquid sulfur with carbon and allowing said sulfur to polymerize and to form solid particles,*

*wherein said plasticized sulfur product is incorporated into said mixture in a weight percentage of at least 60%, said hydrocarbon-based material is incorporated into said mixture in a weight percentage of at least 10% and said fine mineral constituent is incorporated into the mixture in a weight percentage of at least 10%, and wherein said solid particles exhibit no agglomeration at temperatures below 175° F.*

*22. A sulfur-rich paving binder obtained by mixing the substances comprising:*

*(a) hydrocarbon-based material;*

*(b) a fine mineral constituent; and*

*(c) a plasticized sulfur product obtained by mixing liquid sulfur with carbon and allowing said sulfur to polymerize,*

*wherein the plasticized sulfur product further comprises amyl acetate, wherein the amyl acetate improves the handling and odor characteristics of the plasticized sulfur product.*

*23. A paving product obtained by mixing substances comprising:*

*(a) a plasticized sulfur product obtained by mixing liquid sulfur with carbon and allowing said sulfur to polymerize;*

*(b) hydrocarbon-based material, and*

*(c) amyl acetate,*

*wherein the amyl acetate improves the handling and odor characteristics of the plasticized sulfur product.*

*24. A composition, comprising: a plasticized sulfur product obtained by forming a mixture by mixing liquid sulfur and an amount of carbon, wherein said amount of carbon is in the range of from about 0.25% to about 1.0% of said mixture and allowing plasticization of at least a portion of said liquid sulfur, and wherein said forming of said mixture further includes mixing an amount of amyl acetate with said liquid sulfur and said amount of carbon, wherein said amount of amyl acetate is in the range of at least about 0.08% of said mixture.*

*25. A composition as recited in claim 24, wherein said amount of amyl acetate is in the range of from about 0.1% to about 1.5% of said mixture.*

*26. A composition as recited in claim 25, wherein said amount of amyl acetate is in the range of from about 0.2% to about 0.4% of said mixture.*

*27. A composition as recited in claim 26, wherein said liquid sulfur of said forming step is at a temperature in the range of from about 120° C. to about 150° C.*

*28. A composition as recited in claim 27, wherein said forming step further includes cooling said mixture having at least a portion of said liquid sulfur that is plasticized to thereby form solid particles of said plasticized sulfur product.*

*29. A composition as recited in claim 28, wherein said solid particles have characteristics such as to exhibit no agglomeration at temperatures under 79° C. (175° F.).*

*30. A composition as recited in any one of claims 24 through 29, further comprising: a hydrocarbon-based material and a fine mineral constituent.*

*31. A composition as recited in any one of claims 24 through 29, further comprising: a hydrocarbon-based material and a fine mineral constituent, wherein said plasticized sulfur product is present in said composition in an amount of at least 60 weight percent of said composition, wherein said hydrocarbon-based material is present in said composition in an amount of at least 10 weight percent of said composition, and wherein said fine mineral constituent is present in said composition in an amount of at least 10 weight percent.*

*32. A composition as recited in any one of claims 24 through 29, further comprising a hydrocarbon-based material and a fine mineral constituent selected from the group of aggregates consisting of fly ash and silica material, and wherein said plasticized sulfur product is present in said composition in an amount of at least 60 weight percent of said composition, wherein said hydrocarbon-based material is present in said composition in an amount of at least 10 weight percent of said composition, and wherein said fine mineral constituent is present in said composition in an amount of at least 10 weight percent.*

*33. A composition, comprising: a plasticized sulfur product obtained by forming a mixture by mixing liquid sulfur and an amount of carbon, wherein said amount of carbon is in the range of from about 0.25% to about 1.0% of said mixture and allowing plasticization of at least a portion of said liquid sulfur; a hydrocarbon-based material; and a fine mineral constituent, wherein said plasticized sulfur product is present in said composition in an amount of at least 60 weight percent of said composition, wherein said hydrocarbon-based material is present in said composition in an amount of at least 10 weight percent of said composition, and wherein said fine mineral constituent is present in said composition in an amount of at least 10 weight percent.*

*34. A composition as recited in claim 33, wherein said forming of said mixture further includes mixing an amount of amyl acetate with liquid sulfur and said amount of carbon, wherein said amount of amyl acetate is in the range of at least about 0.08% of said mixture.*

*35. A composition as recited in claim 34, wherein said amount of amyl acetate is in the range of from about 0.1% to about 1.5% of said mixture.*

*36. A composition as recited in claim 35, wherein said amount of amyl acetate is in the range of from about 0.2% to about 0.4% of said mixture.*

*37. A composition as recited in claim 36, wherein said liquid sulfur of said forming step is at a temperature in the range of from about 120° C. to about 150° C.*

*38. A composition as recited in claim 37, wherein said forming step further includes cooling said mixture having at least a portion of said liquid sulfur that is plasticized to thereby form solid particles of said plasticized sulfur product.*

*39. A composition as recited in claim 38, wherein said solid particles have characteristics such as to exhibit no agglomeration at temperatures under 79° C. (175° F.).*

*40. A composition, comprising: a plasticized sulfur product obtained by forming a mixture by mixing liquid sulfur and an amount of carbon, wherein said amount of carbon is in the range of from about 0.25% to about 1.0% of said mixture and allowing plasticization of at least a portion of said liquid sulfur; a hydrocarbon-based material; and a fine mineral constituent selected from the group of aggregates consisting of fly ash and silica material, and wherein said plasticized sulfur product is present in said composition in an amount of at least 60 weight percent of said composition, wherein said hydrocarbon-based material is present in said composition in an amount of at least 10 weight percent of said composition, and wherein said fine mineral constituent is present in said composition in an amount of at least 10 weight percent.*

*41. A composition as recited in claim 40, wherein said forming of said mixture further includes mixing an amount of amyl acetate with liquid sulfur and said amount of carbon, wherein said amount of amyl acetate is in the range of at least about 0.08% of said mixture.*

*42. A composition as recited in claim 41, wherein said amount of amyl acetate is in the range of from about 0.1% to about 1.5% of said mixture.*

*43. A composition as recited in claim 42, wherein said amount of amyl acetate is in the range of from about 0.2% to about 0.4% of said mixture.*

*44. A composition as recited in claim 43, wherein said liquid sulfur of said forming step is at a temperature in the range of from about 120° C. to about 150° C.*

*45. A composition as recited in claim 44, wherein said forming step further includes cooling said mixture having at least a portion of said liquid sulfur that is plasticized to thereby form solid particles of said plasticized sulfur product.*

*46. A composition as recited in claim 45, wherein said solid particles have characteristics such as to exhibit no agglomeration at temperatures under 79° C. (175° F.).*

*47. A composition as recited in claim 46, wherein said concentration of carbon is 0.4 weight % to about 0.8 weight %.*

*48. A composition as recited in claim 47, wherein said composition mixture further comprises a hydrocarbon-based material.*

*49. A composition as recited in claim 48, wherein said composition further comprises an aggregate having been mixed with said composition mixture in liquefied form.*

*50. A composition as recited in claim 49, wherein said hydrocarbon-based material is selected from the group consisting of asphalt, heavy crude oil, and fuel oil.*

*51. A composition as recited in claim 46, wherein said solid particles are of the type that includes pastilles, slates, pellets, chips, and briquettes.*

*52. A composition as recited in claim 51, wherein said composition mixture further comprises a hydrocarbon-based material.*

*53. A composition as recited in claim 52, wherein said composition further comprises an aggregate having been mixed with said composition mixture in liquefied form.*

*54. A composition as recited in claim 53, wherein said composition has a concentration of carbon of at least 0.25 weight %, with the weight % being based on the weight of said plasticized sulfur composition.*

*55. A composition as recited in claim 54, further comprising aggregate.*

*56. A composition as recited in claim 53, wherein said composition has a concentration of carbon of from about 0.25 weight % to about 1.0 weight %, with the weight % being based on the weight of said plasticized sulfur composition.*

*57. A composition as recited in claim 56, further comprising aggregate.*

*58. A composition as recited in claim 53, wherein said composition has a concentration of carbon of from about 0.4 weight % to about 0.8 weight %, with the weight % being based on the weight of said plasticized sulfur composition.*

*59. A composition as recited in claim 58, further comprising aggregate.*

*60. A composition as recited in claim 53, wherein said composition contains between about 20 weight % and 60 weight % of said plasticized sulfur composition based on the weight of said plasticized sulfur composition and said hydrocarbon-based material.*

*61. A composition as recited in claim 53, further comprising aggregate.*

*62. A composition as recited in claim 46, wherein said solid particles are of the size that units thereof expose a surface area within the range of from about 0.25 $in^2$ to about 4 $in^2$.*

*63. A composition as recited in claim 46, wherein said composition mixture includes between about 20% and 60% said plasticized sulfur composition.*

*64. A composition as recited in claim 63, wherein said hydrocarbon-based material is selected from the group consisting of asphalt, heavy crude oil, and fuel oil.*

*65. A composition as recited in claim 46, wherein said composition mixture further comprises a hydrocarbon-based material.*

*66. A composition as recited in claim 65, wherein said composition further comprises an aggregate having been mixed with said composition mixture in liquefied form.*

*67. A composition as recited in claim 66, wherein said hydrocarbon-based material is selected from the group consisting of asphalt, heavy crude oil, and fuel oil.*

*68. A composition, comprising: a plasticized sulfur composition obtained by forming a mixture comprising liquid sulfur and a concentration of carbon, under conditions wherein at least a portion of said liquid sulfur is plasticized, to thereby provide said plasticized sulfur composition; and a hydrocarbon-based material selected from the group consisting of asphalt, heavy crude oil, and fuel oil.*

*69. A composition as recited in claim 68, further comprising aggregate.*

*70. A composition, comprising:*

*a composition mixture comprising solid particles of a plasticized sulfur composition obtained by forming a sulfur mixture consisting essentially of liquid sulfur and a concentration of carbon of from about 0.25 weight % to about 1.0 weight %, with the weight % being based on the weight of said plasticized sulfur composition, under conditions wherein at least a portion of said liquid sulfur is plasticized to thereby provide said plasticized sulfur composition, and wherein said solid particles are formed from said plasticized sulfur composition.*

*71. A composition as recited in claim 70, wherein said composition mixture further comprises a hydrocarbon-based material.*

*72. A composition as recited in claim 71, wherein said composition further comprises an aggregate having been mixed with said composition mixture in liquefied form.*

*73. A composition as recited in claim 72, wherein said hydrocarbon-based material is selected from the group consisting of asphalt, heavy crude oil, and fuel oil.*

* * * * *